United States Patent

Levinos

[15] 3,637,375

[45] Jan. 25, 1972

[54] PHOTOPOLYMERIZATION UTILIZING DIAZOSULFONATES AND PHOTOREDUCIBLE DYES

[72] Inventor: Steven Levinos, 25 Hickory Pl., Chatham, N.J. 07928

[22] Filed: May 25, 1970

[21] Appl. No.: 40,439

[52] U.S. Cl. ....................................96/28, 96/35.1, 96/91 R, 96/115 P, 204/159.24

[51] Int. Cl. ....................................G03c 1/70

[58] Field of Search ................96/115, 35.1, 115 P, 28, 91 R; 204/159.24

[56] References Cited

UNITED STATES PATENTS

| | | | |
|---|---|---|---|
| 2,661,331 | 12/1953 | Howard | 96/115 |
| 2,875,047 | 2/1959 | Oster | 96/115 |
| 3,138,460 | 6/1964 | Levinos | 96/115 |
| 2,996,381 | 8/1961 | Oster et al. | 96/115 |
| 3,099,558 | 7/1963 | Levinos | 96/35.1 |
| 3,097,096 | 7/1963 | Oster | 96/115 |

*Primary Examiner*—Ronald H. Smith
*Attorney*—J. Russell Juten, Peter F. Willig, Lionel N. White and Milford A. Juten

[57] ABSTRACT

Polymerization of ethylenically unsaturated vinyl compounds is effected by exposing such compounds to light in the presence of a photoinitiator comprising a combination of a light-sensitive diazosulfonate and a photoreducible dye. The further addition of amines and aldehyde/bisulfite addition products accelerates the polymerization reaction.

10 Claims, No Drawings

PHOTOPOLYMERIZATION UTILIZING DIAZOSULFONATES AND PHOTOREDUCIBLE DYES

BACKGROUND OF THE INVENTION

Addition polymerization of various ethylenically unsaturated organic compounds such as vinyl compounds or vinyl monomers is well known. Generally, addition polymerization of monomeric vinyl compounds is brought about in the presence of a peroxide catalyst at elevated temperatures, the peroxide serving to supply a free radical for initiating the polymerization. Such a reaction can be carried out by employing a solution of the monomer, or it may be desirable to employ the monomer in the form of a dispersion. By using mixtures of various vinyl compounds it is possible to obtain a mixed polymer, or copolymer, having properties which differ from those of the homopolymer.

It is also known that many unsaturated monomers can be caused to polymerize by exposure to high intensity radiation, such as ultraviolet rays emanating from sunlight or a carbon arc. It is to be noted, however, that polymerization by the use of light alone proceeds at a much slower rate than polymerization brought about by the peroxide and heat. Moreover, the use of light unaided by other agents tends to result in lower molecular weight polymers.

The use of radiation alone to bring about polymerization of monomeric substances not only tends to produce low molecular weight products, but in addition dictates the use of high intensity radiation such as sunlight, flame carbon arc, and the like. It is possible, however, to amplify the efficiency of the exposing radiation by the use of certain catalytic materials generally referred to as photosensitizers or photoinitiators. Such activators, under the influence of the exposing radiation, give rise to an activated form, which actually brings about polymerization. The photoinitiators are activated upon exposure to light, and these active structures trigger the polymerization reaction.

Photoinitiators useful for photopolymer systems may comprise a single component as described in U.S. Pat. No. 3,061,431, British Pat. No. 866,631 and U.S. Pat. No. 3,065,160, or may be multicomponent photocatalyst systems as described in U.S. Pat. Nos. 3,101,270, 2,850,445, and 3,234,021. The use of certain diazo compounds in photoinitiator compositions for photopolymer systems has been described in U.S. Pat. No. 3,099,558 and Canadian Pat. No. 820,828.

SUMMARY OF THE INVENTION

The present invention represents an improvement in photopolymerization systems which utilize diazo compounds in photoinitiator compositions and comprises the use of a combination of a light-sensitive diazosulfonate compound and a photoreducible dye as the photoactive catalyst which upon exposure to light yields free radicals which in turn initiate and support the polymerization of vinyl monomers present in the system.

The activity of multicomponent photoinitiator compositions in photopolymerization systems is believed, in general, to involve a light-initiated redox reaction between the photoinitiator components with the resulting formation of free radicals. Thus, the effectiveness of a photoinitiator would appear to rely considerably upon the relative redox "potentials" of its component compounds as well as upon their respective photosensitivities. Of equal importance, however, to the practical utility of a photoinitiator composition is the degree of dark stability the components exhibit, particularly when in mutual combination. This requirement for dark stability has heretofore seriously restricted the selection of photoinitiator components to compounds having limited relative redox potentials.

In Canadian Pat. No. 820,828, for example, the components of a photopolymerization initiator system have been selected from diazonium salts which respectively exhibit the capability of acting as electron donors and as electron acceptors. The similarities in the constitution of such diazonium compounds as well as the inherent limitations in dark stability generally result in relatively low redox potentials and thus low rates of polymerization upon photoactivation. Similarly, in U.S. Pat. No. 3,099,558, where diazonium salts are utilized as electron acceptors in systems with electron-donating light-absorbing dyes normally employed as sensitizers in silver halide photographic materials, redox potentials are substantially restricted as is evidenced by the inordinately long light exposures therein described.

It has now been discovered in the present invention that a surprisingly great increase in the photoactivity of polymerization systems can be achieved without a commensurate loss in dark stability when photoinitiator compositions are prepared by combining light-sensitive diazosulfonate compounds with photoreducible dyes. The excellent stability of diazosulfonate compounds has been found to contribute significantly to the preexposure stability of the photopolymerizable materials, yet the light sensitivity of the diazosulfonate and the apparently high redox potential in its combination with photoreducible dye result in rapid formation of free radicals which effect polymerization of the vinyl components in the system. Further, it would appear that the electron donor character of the diazosulfonate in the photoinitiator combination and the capability of the photoreducible dye to vary between the normal and leuco states tend toward the formation of a multiplicity of free radicals which result in the greatly increased yield of polymer as compared with prior systems under similar conditions of light exposure. The practical consequence of the present photoinitiator compositions is thus an increase in both dark stability and photosensitivity of the resulting photopolymerizable systems.

DESCRIPTION OF THE INVENTION

In accordance with the present invention, polymerization of vinyl monomers is accomplished by exposing a monomer or mixture of monomers to radiation in the presence of a photoinitiator comprising a light-sensitive diazosulfonate and a photoreducible dye. For instance, acrylamide in an aqueous solution with a cross-linking agent is converted to a hard, polymeric mass in a matter of seconds by exposure to light in the presence of such a photoinitiator composition.

The dyes which may be used in accordance with this invention include any dyes which are capable of forming a stable system with a reducing agent in the absence of light and which will undergo reduction when irradiated with visible light in the presence of the reducing agent. Such photoreducible dyes include rose bengal, erythrosin, eosin, fluorescein, acriflavine (CI 46000), methylene blue, thionin, brilliant green (CI 42040), methylene green riboflavin and methyl violet (CI 42535). The dyes may be used individually or in admixture to increase sensitivity over a wider range of the visible spectrum.

While the concentration of dye is not critical, the most efficient results are obtained when the concentration is adjusted so that at least 90 percent of the incident light is absorbed at the wave length corresponding to the absorption maximum of the particular dye employed.

The diazosulfonates used as a component part of the photocatalyst are very stable compounds in the absence of light, but generate reducing groups upon exposure to actinic radiation. Thus, these reducing groups (electron donors) reacting with the photoexcited dyes (electron acceptors) constitute a redox reaction in which free radicals are produced. It is apparently these photogenerated free radicals which initiate the polymerization reaction.

An intense source of light is not required to initiate the photopolymerization in systems according to the present invention. For example, the photopolymerization of acrylamide noted above may be carried out by exposing the monomers and photocatalyst mixture to an incandescent lamp of only 375 watts positioned at a distance of approximately 10 inches.

The diazosulfonates are prepared by the action of sulfites, in neutral or slightly alkaline solutions, on diazo compounds, and are commonly represented by the structure $ArN_2 \cdot SO_3M$, where M is an atom of a monovalent metal or its equivalent. This reaction of diazo compounds with sulfites affords crystalline, stable, and easily isolated salts.

Diazo compounds suitable for conversion to diazosulfonates for the purpose of this invention include:

4-diazo-phenyl morpholine
4-diazo-2,5-diethoxy-phenyl morpholine
p-diazo-1-tolyl mercapto-2,5-dimethoxy-benzene
p-diazo-1-tolyl mercapto-2,5-diethoxy-benzene
1-diazo-4-N,N-diethylamino-benzene
1-diazo-4-N-ethyl-N-benzylamino-benzene
1-diazo-2,5-diethoxy-4-benzoylamino-benzene
1-diazo-5-chloro-2-methoxy-benzene
1-diazo-2,5-diethoxy-benzene
1-diazo-2-chloro-5-methoxybenzene
1-diazo-3-chloro-4,6-dimethoxy-benzene
1-diazo-4-methoxy-benzene
1-diazo-2,5-dibutoxy-4-morpholino-benzene
1-diazo-2-chloro-5-(β-methoxy ethoxy)-4-(benzyl, β-acetoxy ethyl) amino-benzene The preferred diazosulfonates for use in this invention are prepared from those of the above listed diazonium salts which have a substituent in a position meta to the diazo group. Such diazosulfonates exhibit considerably more catalytic activity than those having substituent groups in other positions of the aromatic nucleus.

Generally speaking, the rate at which polymerization is promoted on exposure to actinic radiation increases as the amount of diazosulfonate is increased. Thus, for bulk polymerization it is preferred to use one part of diazosulfonate for 50 to 100 parts of monomer on the dry weight basis. For optimum light response in coated layers, the diazosulfonate may be employed in an amount corresponding to 2 to 4 parts for approximately 15 parts of monomer and binder, again on a dry weight basis.

Any normally liquid or solid photopolymerizable unsaturated organic compound is applicable in the practice of my invention. Preferably, such compounds should be ethylenically unsaturated, i.e., contain at least one nonaromatic double bond between adjacent carbon atoms. Compounds particularly advantageous include vinyl or vinylidene compounds containing a $CH_2=C<$ group activated by direct attachment to a negative group such as halogen, $>C=O$, $-C\equiv N$, $-C\equiv C-$, $-O-$, or aryl. Examples of photopolymerizable compounds include acrylamide, acrylonitrile, diacetone acrylamide, N-methylolacrylamide, N-isopropyl acrylamide, acrylic acid, methacrylic acid, methacrylamide, vinyl acetate, methyl methacrylate, methyl acrylate, ethyl acrylate, vinyl benzoate, vinyl pyrrolidone, N-vinyl carbazole, barium acrylate, barium methacrylate, zinc acrylate, calcium acrylate, magnesium acrylate, itaconic acid, itaconic esters, mixtures of ethyl acrylate with vinyl acetate, acrylonitrile with styrene, butadiene with acrylonitrile.

The ethylenically unsaturated organic compounds, or monomers, may be used either alone or in admixture in order to vary the physical properties, such as molecular weight, hardness, solubility, of the final polymer. Thus, in order to produce a vinyl polymer of the desired physical properties, it is a recognized practice to polymerize the vinyl monomer in the presence of a small amount of an unsaturated compound containing at least two terminal vinyl groups each linked to a carbon atom in a straight chain or in a ring. The function of such compounds is to cross-link the polyvinyl chains. Cross-linking agents which can be utilized for the purpose described herein include N,N'-methylene-bisacrylamide, triallyl cyanurate, divinyl benzene, divinyl ketones and diglycol diacrylate. Difunctional monomers such as calcium acrylate, barium acrylate, zinc acrylate and the like may also be advantageously employed. Generally, increasing the quantity of cross-linking agent increases the hardness of the polymer obtained. The quantity of cross-linking agent may desirably range from about 2 to 10 parts for 100 parts of monomer.

The present invention may be used for bulk or imagewise polymerization of vinyl monomers. Bulk polymerization is usually carried out in a water or organic solvent solution of the monomer depending upon its solubility characteristics. If an organic solvent system is employed, provisions should be made for the presence in the system of a small quantity of water, e.g., about 0.1 to 5 percent by weight. The water may be added as such or may be supplied by incorporation in the reaction mixture of a humectant such as ethylene glycol, glycerin or the like.

Photosensitive coatings may be prepared readily by combining in solution a vinyl monomer, such as acrylamide, a cross-linking agent, such as N,N'-methylenebisacrylamide, a diazosulfonate, a photoreducible dye, and a suitable film-forming binder. This mixture is then coated, by any common method, on a support, such as a cellulose or polyester film base material. Other desirable additives may also be incorporated in the light-sensitive composition.

Light-sensitive coatings so obtained are, after drying, exposed imagewise to a light source such as an incandescent lamp whereby polymerization rapidly takes place in the exposed areas. Unexposed areas may then be removed by washing to produce a resist or relief image. In some instances, depending upon the monomers selected, a change in hydrophilic and oleophilic properties results from polymerization, and the imaged material may be employed as a plate in printing processes.

The photosensitive composition may be coated as a single layer or it may be coated in a multiple layer structure. The composition of each layer for such latter systems may be varied as desired. One advantage of the laminate arrangement resides in the fact that by varying a formulation it is possible to obtain a positive image on one surface and a negative image on the other after the two supporting layers are peeled apart. Thus, a washout process step is obviated. The image corresponding to the original may be hardened and thereby fixed by a blanket exposure to actinic radiation to polymerize the otherwise unexposed areas of the coating.

The rate at which insoluble polymer is photoformed may be accelerated by the inclusion of metal salts in the photopolymerizable composition. These include the chlorides of lithium, sodium, potassium, calcium, barium, strontium, magnesium, cadmium, mercury and zinc; the sulfates of lithium, sodium, potassium and beryllium; the acetates of lithium, sodium, potassium, calcium and zinc; lithium nitrate, sodium nitrate and potassium nitrate, among others.

Other additives by means of which the rate of forming insoluble polymer may be enhanced when the photopolymerizable composition is exposed to actinic radiation are the primary, secondary and tertiary aliphatic or aromatic amines. Examples include monoethanolamine, diethanolamine, triethanolamine and their formic, boric, or hydrochloric acid salts, aniline salts such as the hydrochloride, oxalate, acetate, or hydrogen phthalate, diphenylamine hydrochloride, and the like. The choice of amine is dictated by considerations of the solvent employed, compatibility with the other components of the system, and the resulting pH after addition of the amine. In this latter respect an alkaline environment is preferred for maximum stability of the diazosulfonate/dye photocatalyst, particularly when the photopolymerizable composition is employed in the form of coated layers for photoimaging purposes.

Still other additives that enhance the rate at which insoluble polymer is photoformed are the aldehyde/sodium bisulfite addition products, such as formaldehyde/sodium bisulfite, acetaldehyde/sodium bisulfite and glutaraldehyde/sodium bisulfite.

In forming photographic resist images, according to the invention, it has been found advantageous to use a hydrophilic colloid as a carrier or binder for the mixture and the photocatalyst. Suitable colloids for this purpose include polyvinyl alcohol, gelatin, casein, glue, saponified cellulose acetate, carboxymethyl cellulose, starch and the like. Long chain polyoxyethylene ethers, such as polyoxyethylene (23) lauryl ether, polyoxyethylene (20) stearyl ether and polyoxyethylene (20) oleyl ether are particularly useful in this respect. These materials not only serve as film-forming carriers, but, in addition, are excellent solvents for the diazosulfonates, monomers and other desired components of the photosensitive formulation. In laminate or multilayer arrangements, previously described, they serve to promote diffusion of components from one layer into the other, thereby assuring optimal reactivity within the system.

A number of the polyethylene glycols may also be used as binders. These compounds, whose properties for the purposes of this invention are similar to the polyoxyethylene ethers described above, are satisfactory carriers for the monomers, photocatalysts and other desirable additives.

Numerous materials can serve as supports or bases for radiation-sensitive coatings prepared in accordance with the present invention and include cellulose ester film which may have surfaces made hydrophilic by partial saponification, metals such as aluminum or zinc, terephthalic acid ester polymers, paper, glass, and the like.

As previously indicated, the invention may be used to homo- or copolymerize vinyl-type monomers in bulk. Imagewise photopolymerization is useful in the preparation of print materials of all types and includes photolithographic printing plates, printed circuits, printing stencils, printing masks and the like.

If desired, a coloring agent such as a dye or pigment may be added to the photopolymerizable composition prior to coating so that the resulting image, after processing, is readily discernible.

PREFERRED EMBODIMENTS

The following examples illustrate the use of the combination of diazosulfonates and photoreducible dyes in the photopolymerization of a variety of vinyl monomers.

EXAMPLE 1

A stock solution of the following composition was prepared:

| | |
|---|---|
| Acrylamide | 36 g. |
| N,N'-methylenebisacrylamide | 2 g. |
| Water | 24 ml. |
| Methyl cellosolve acetate | 20 ml. |

To 20 ml. of this solution were added 100 milligrams of the diazosulfonate of p-anisidine, followed by 5 drops of a 0.2-percent aqueous solution of methylene blue (CI 52015). A 5 ml. portion of this mixture was transferred to a 13×100 mm. test tube which was then exposed to the light of a 375-watt photoflood lamp positioned at a distance of 10 inches. A white opaque polymer began to form after an exposure of 42 seconds.

In this as in other examples, the role of methyl cellosolve acetate is to precipitate the photoformed polymer as a white opaque solid, thus facilitating the timing of the onset of polymerization.

EXAMPLE 2

The composition used in this experiment was identical to that of Example 1 except that 100 milligrams of p-diazosulfonate-1-tolyl mercapto-2,5-dimethoxybenzene was substituted for the diazosulfonate of p-anisidine. Upon exposure to light as in Example 1, polymer began to form after a period of 11 seconds.

This example illustrates the difference in reactivity between diazosulfonates of different structures and particularly demonstrates the greater reactivity of diazosulfonates with substituent groups in a position meta to the diazo group to which earlier reference has been made.

EXAMPLE 3

To 5 ml. of the photopolymerizable diazosulfonate/dye sensitized composition of Example 1 were added 10 drops of a 50-percent aqueous solution of diethanolamine borate. Upon exposure to light as in the preceding examples, polymer began to form after a period of only 15 seconds, illustrating the accelerating effect of amine derivatives in compositions of the present invention.

EXAMPLE 4

To 30 ml. of the stock monomer solution of Example 1 were added 150 milligrams of the diazosulfonate of p-anisidine, followed by 8 drops of a 0.2-percent aqueous solution of methylene blue. A 5 ml. portion of this mixture when exposed to light as before required 38 seconds for the onset of polymerization. The dissolution of 150 milligrams of acetaldehyde/sodium bisulfite in the remaining 25 ml. of the above mixture reduced the time for the onset of polymerization in a 5 ml. sample to 32 seconds, illustrating the accelerating effect of the aldehyde/sodium bisulfite addition compounds. Twenty drops of a 50-percent aqueous solution of diethanolamine borate when added to the remaining 20 ml. of the above mixture reduced the time for the onset of polymerization to 3 seconds when a 5 ml. portion was exposed to light as before.

This example is illustrative of the synergistic accelerating effects obtainable when an amine derivative is employed conjointly with an aldehyde/sodium bisulfite addition compound.

EXAMPLE 5

To further illustrate the difference in reactivity between diazosulfonates of different structure there were added to 50 ml. of the stock monomer solution of Example 1, 10 drops of a 50-percent aqueous solution of diethanolamine borate, 200 milligrams of acetaldehyde/sodium bisulfite and 10 drops of a 0.2-percent aqueous solution of rose bengal (CI 45440). This mixture was divided into 2 equal parts. To one part was added 100 milligrams of p-diazosulfonate-1-tolyl mercapto-2,5-dimethoxy-benzene, and an equal weight of p-diazosulfonate-1-tolyl mercapto-2,5-diethoxybenzene was dissolved in the other portion of the mixture. Five ml. portions of each mixture in 13×100 mm. test tubes were exposed as in Example 1. The first sample containing p-diazosulfonate-1-tolyl mercapto-2,5-dimethoxybenzene began to polymerize after the lapse 127 seconds; the other sample required 157 seconds exposure before the onset of polymerization.

EXAMPLE 6

This example demonstrates the difference in sensitization imparted to a photopolymerizable diazosulfonate-containing mixture by different photoreducible dyes.

Fifty ml. of the stock monomer solution of Example 1 was adjusted to a pH of 9.0 with dilute sodium hydroxide. Then 200 milligrams of the diazosulfonate of p-anisidine and 200 milligrams of acetaldehyde/sodium bisulfite were added with stirring to effect solution of the solids. The mixture was then divided into 2 equal parts. One portion was sensitized with 5 drops of a 0.2-percent aqueous solution of rose bengal, the other portion with 5 drops of an aqueous solution of methylene blue of the same concentration. Five ml. portions of each mixture were used for the test exposures as in the earlier examples. The mixture sensitized with rose bengal required an exposure of 87 seconds before the onset of polymerization, whereas only 11 seconds were required for the methylene blue sensitized composition.

EXAMPLE 7

This example further illustrates the difference in reactivity of photoreducible dyes employed for photosensitization.

Two hundred milligrams of acetaldehyde sodium bisulfite and 200 milligrams of p-diazosulfonate-2,5-diethoxy benzoyl aniline were dissolved in 50 ml. of the stock monomer solution of Example 1, which had previously been adjusted to a pH value of 9.0 with 50-percent aqueous diethanolamine borate. This mixture was then divided into 2 equal parts. Five drops of a 0.2-percent aqueous solution of methylene green (CI 52020) were added to one portion, and 5 drops of a 0.2-percent aqueous solution of thionin (CI 52000) were added to the other. When 5 ml. portions of each mixture in 13×100 mm. test tubes were exposed to light in the preceding examples, the methylene green sensitized mixture required an exposure of 31 seconds before the onset of polymerization. The thionin sensitized mixture required an exposure of only 10 seconds to initiate the polymerization reaction.

EXAMPLE 8

One hundred milligrams of the diazosulfonate of 4-chloro-3-amino-1-anisole were dissolved in 25 ml. of the stock monomer solution of Example 1, followed by the addition of 5 drops of a 0.2-percent aqueous solution of methylene blue. A 5 ml. portion of this mixture when exposed to light as in the preceding examples required an exposure of 45 seconds before the onset of polymerization. The remainder of the solution was then saturated with respect to magnesium chloride. A 5 ml. portion was then exposed to light as before. A lapse of 31 seconds was required before polymerization was initiated.

This example illustrates the use of metal salts for increasing the rate at which polymer is photoformed; the time required for the onset of polymerization has been reduced by approximately 30 percent.

EXAMPLE 9

Five grams of N,N′-methylenebisacrylamide were dissolved in 150 ml. of a 60-percent aqueous solution of N-methylolacrylamide. Fifty ml. of methyl cellosolve acetate were then added. The monomer concentration of this stock solution was the same as that of the stock monomer solution of Example 1.

One hundred milligrams of p-diazosulfonate-1-tolyl mercapto-2,5-dimethoxybenzene were dissolved in 25 ml. of the above stock solution, and 5 drops of a 0.2-percent aqueous solution of erythrosin B (CI 45430) were then stirred in. A 5 ml. portion was exposed to light, as before in other examples, and it was noted that a 120-second exposure was required before the onset of polymerization.

A 25 ml. aliquot of this mixture was taken to which 1 drop of a 0.2-percent aqueous solution of thionin was added. When 5 ml. of this mixture were exposed to light as before, the time of exposure before initiation of polymerization was found to be reduced from 120 seconds to 75 seconds.

The balance of the mixture containing only erythrosin B as the sensitizing dye was now saturated with ammonium acetate. When a 5 ml. portion was exposed to light, polymerization ensured after the lapse of 75 seconds.

These experiments demonstrate the use of mixed sensitizing dyes and demonstrate the utility of salts in reducing the time necessary to initiate the photopolymerization reaction.

EXAMPLE 10

Fifty milligrams of p-diazosulfonate-1-tolyl mercapto-2, 5-dimethoxybenzene were dissolved in 10 ml. of a polyethylene glycol of molecular weight 500. Then 15 ml. of glycidyl methacrylate were added, followed by 5 drops of a 0.2-percent aqueous solution of thionin. When a 5 ml. portion of this mixture was exposed to light as in the preceding examples, 150 seconds exposure was required to start the polymerization reaction; at the end of 300 seconds the entire mass had polymerized to a semirigid gel.

EXAMPLE 11

In 25 ml. of a 15-percent aqueous solution of barium methacrylate were dissolved 50 milligrams of the diazosulfonate employed in Example 10. Five drops of a 0.2-percent aqueous solution of methylene blue were then mixed in. When a 5 ml. portion of this mixture was exposed to light as before, 205 seconds elapsed before the onset of polymerization.

The following examples illustrate the photoformation of copolymers when employing diazosulfonates in admixture with photoreducible dyes as photoinitiators.

EXAMPLE 12

Fifty milligrams of the diazosulfonate used in Example 10 were dissolved in 8 ml. of a polyethylene glycol of molecular weight 500. Three ml. of the following monomer composition were then added:

| | |
|---|---|
| Acrylamide | 180 g. |
| N,N′-methylenebisacrylamide | 10 g. |
| Water | 120 ml. |

This addition was followed by 9 ml. of acrylonitrile and 4 drops of a 0.2-percent aqueous solution of methylene blue. An exposure of 175 seconds under the conditions of the preceding examples was required before the onset of polymerization.

EXAMPLE 13

To 20 ml. of a 15-percent aqueous solution of calcium acrylate were added 5 ml. of a 25-percent aqueous solution of sodium vinyl sulfonate. Seventy-five milligrams of the diazosulfonate employed in Example 10 were dissolved in this mixture, followed by the addition of 5 drops of a 0.2-percent aqueous solution of methylene blue. A 5 ml. portion when exposed to light as in the earlier examples required the lapse of 30 seconds for initiation of the polymerization reaction. When 100 milligrams of formaldehyde/sodium bisulfite were dissolved in the remaining 20 ml. of the mixture and a 5 ml. portion exposed to light, the time interval for the onset of polymerization was reduced to 12 seconds. Once again the accelerating effects of the aldehyde/bisulfite addition compounds is evident.

EXAMPLE 14

Fifteen ml. of a 60-percent aqueous solution of the methylol derivative of diacetone acrylamide were mixed with 10 ml. of a 15-percent aqueous solution of calcium acrylate. One hundred milligrams of p-diazosulfonate-N-ethyl-N-benzyl aniline were then dissolved in this mixture, followed by the addition of 5 drops of a 0.2-percent aqueous solution of methylene blue. A 5 ml. portion when exposed to light as in the previous examples required 143 seconds before the polymerization reaction started. The remaining solution was then saturated with aniline acetate. A 5 ml. portion of this solution when exposed to light as before required 110 seconds before the onset of polymerization.

This example demonstrates the use of another diazosulfonate of those mentioned earlier and further illustrates the use of an amine for promoting the rate at which polymers or copolymers, as in this case, are photoformed.

EXAMPLE 15

Two grams of dimethyl itaconate were dissolved in 8 ml. of methyl cellosolve acetate and then 15 ml. of the monomer composition of example 12 were mixed in. This was followed by the addition of 75 milligrams of the diazosulfonate employed in example 10 and 5 drops of a 0.2-percent aqueous solution of thionin. The mixture was stirred to effect solution of the diazosulfonate. Exposure of a 5 ml. portion of this composition as in the preceding examples resulted in the initiation of polymerization after the lapse of 24 seconds.

EXAMPLE 16

One gram of allyl methacrylate was dissolved in 5 ml. of a polyethylene glycol of molecular weight 500. To this mixture were added 10 ml. of the monomer composition of Example 12, followed by 50 milligrams of p-anisidine diazosulfonate with stirring to effect its dissolution. Then 2 drops each of a 0.2-percent aqueous solution of erythrosin B and a 0.2-percent aqueous solution of thionin were mixed in. A white opaque copolymer began to form after 34 seconds when a 5 ml. portion of the mixture was exposed to light as in the other examples given.

EXAMPLE 17

Two grams of sodium maleate were dissolved in 15 ml. of the monomer composition of Example 12 and then 5 ml. of methyl cellosolve acetate were mixed in. This is followed by the addition of 50 milligrams of the diazosulfonate of 4-chloro-3-amino-1-anisole, 2 drops of a 0.2-percent aqueous solution of methylene blue and 2 drops of a 0.2-percent aqueous solution of erythrosin B. When a 5 ml. portion of this mixture was exposed to light under the conditions employed in the preceding examples, the white opaque copolymer began to form after the lapse of 46 seconds.

It has earlier been noted above that U.S. Pat. No. 3,099,558 describes the use in photopolymerization systems of numerous dyes commonly employed to improve the light sensitivity of silver halide photographic compositions. The distinct difference in the effect of such sensitizing dyes and the photoreducible dyes when used with diazosulfonates as polymerization photoinitiators according to the present invention is evident in the following examples.

EXAMPLE 18

A stock solution of monomer was prepared as in Example 12. In 40 ml. of the stock solution there was then dissolved 40 milligrams of p-anisidine diazosulfonate. To a first 5 ml. portion of the resulting solution was added 3 drops of a 0.2-percent aqueous solution of the photoreducible dye rose bengal (spectral absorption peak—542 m$\mu$). To a second 5 ml. portion of the resulting solution was added 3 drops of a 0.2-percent solution in ethanol of the panchromatic photographic sensitizing dye, 1,1'-diethyl-8-methyl-thiocarbocyanine (spectral absorption peak—538 m$\mu$). Under light exposure conditions described above the first sample formed a solid polymerized mass in 60 seconds, while the second sample required 510 seconds to become similarly polymerized.

EXAMPLE 19

A comparison of the activities of methylene blue and the orthochromatic sensitizing dye, 3,3',8-trimethyl-oxacarbocyanine, was conducted with a monomer solution prepared by saturating the stock solution of Example 18 with p-diazosulfonate-1-tolylmercapto-2,5-di-ethoxybenzene. Under similar conditions of light exposure, 15 drops of a 0.2-percent solution of the cyanine dye and 9 minutes light exposure was required to yield an equivalent amount of polymer as 3 drops of a 0.2-percent solution of methylene blue and 1.8 minutes exposure.

The following examples illustrate the use of photopolymerizable compositions as coatings for photoimaging purposes.

EXAMPLE 20

| | |
|---|---|
| SOLUTION 1: | |
| Gelatin | 10.5 g. |
| Water (deionized) | 100 ml. |
| SOLUTION 2: | |
| Coconut fatty acid alkanolamide | 2.0 g. |
| *p-diazosulfonate-1-tolyl mercapto-2,5-dimethoxybenzene | 2.0 g. |
| Water (deionized) | 40 ml. |
| *(Ground to smooth paste with alkanolamide and water) | |
| SOLUTION 3: | |
| Diethanolamine borate (50% aq. sol.) | 2.0 g. |
| Water (deionized) | 10 ml. |
| SOLUTION 4: | |
| Acrylamide | 4.2 g. |
| N,N'-methylenebisacrylamide | 0.8 g. |
| Water (deionized) | 30 ml. |
| SOLUTION 5: | |
| fluorescein (CI 45350), sodium salt | 50 mg. |
| Water (deionized) | 20 ml. |

After these solutions were prepared, they were added in sequence to Solution 1 with stirring to effect thorough mixing. The composition was then coated on a polyester film support, subbed in a common manner to ensure coating adherence, on a vertical loop meniscus coater at a speed of 7.5 feet per minute. The coating was then allowed to dry. This coating was exposed in contact with a line negative to the light of a 500-watt photoflood lamp positioned at a distance of 12 inches for 10 seconds. Unexposed areas were removed by careful washing with water at a temperature of 25°–30° C., thereby yielding a clear positive image.

EXAMPLE 21

This was similar to Example 20 except for the following changes:

SOLUTION 2:

p-diazosulfonate-1-tolyl mercapto-2,5-diethoxy benzene was employed in lieu of the dimethoxy derivative.

SOLUTION 5:

Erythrosin B was used in lieu of sodium fluorescein.

A 15-second exposure, under conditions similar to those of the preceding example, resulted in good image formation.

EXAMPLES 22–25

Prepigmented coatings were made from the following photopolymerizable composition:

| | |
|---|---|
| SOLUTION 1: | |
| Gelatin | 10.5 g. |
| Urea (gelatin softener) | 0.225 g. |
| Water (deionized) | 100 ml. |
| SOLUTION 2: | |
| p-diazo-1-tolyl mercapto-2,5-dimethoxybenzene chlorozincate | 1.74 g. |
| Water (deionized) | 50 ml. |
| SOLUTION 3: | |
| Phloroglucinol | 0.67 g. |
| Ethanol | 20 ml. |
| Water (deionized) | 20 ml. |
| SOLUTION 4: | |
| *p-diazosulfonate-1-tolyl mercapto-2,5-dimethoxy benzene | 4.0 g. |
| Water (deionized) | 70 ml. |
| **Aerosol A-102 | 45 drops |
| *(Ground to smooth paste with Aerosol and water) | |
| **(Trademark of American Cyanamid Company for disodium ethoxylated alcohol half ester of sulfosuccinic acid) | |
| SOLUTION 5: | |
| Acrylamide | 4.2 g. |
| N,N'-methylenebisacrylamide | 0.8 g. |
| Diethanolamine borate (50% aq. sol.) | 2.0 g. |
| Water (deionized) | 60 ml. |

All solutions were added in sequence to Solution 1 with stirring to effect thorough mixing. During this mixing the combination of Solutions 2 and 3 effects an in situ formation of a black azo dye pigment. Substitution of the direct addition of colored pigment pastes or coloring dyes can also be employed to effect desired coloration of the final image. Seventy-five ml. portions of this mixture were then dye-sensitized with the following:

| | |
|---|---|
| a. Methylene blue | 3.75 mg. |
| b. Thionin | 3.75 mg. |
| c. Thionin | 7.50 mg. |
| d. Eosin Y (CI 45380) | 3.75 mg. |

Coatings were made and exposed as in Example 21 with the following times required to yield a black, polymeric relief image after swabbing with water at a temperature of 30°–35° C.:

a. 30 seconds
b. 30 seconds
c. 15 seconds
d. 60 seconds

The support employed for these coatings was a subbed, matte surface, polyester film base commonly used for drafting work. Alterations could be made by the selective removal of image areas with a moist eraser, followed by the pen application of india ink to effect the desired changes.

EXAMPLE 26

The following photopolymerizable composition was prepared for photo-template use:

| | |
|---|---|
| SOLUTION 1: | |
| Gelatin | 5.0 g. |
| Urea (gelatin softener) | 0.225 g. |
| Water (deionized) | 100 ml. |
| SOLUTIONS 2 and 3: | |
| Same as in Examples 22–25 | |
| SOLUTION 4: | |
| *p-diazosulfonate-1-tolyl mercapto-2,5-dimethoxy benzene | 4.0 g. |
| Polyvinyl pyrrolidone (K-30) | 1.6 g. |
| ***Arosurf 160-E 15 | 1.0 g. |
| Water (deionized) | 50 ml. |
| *(Ground to smooth paste with other components and water) | |
| ***(Trademark of Ashland Chemical Company for Coco amine plus 15 moles ethylene oxide) | |
| SOLUTION 5: | |
| Gelatin | 4.5 g. |
| Acrylamide | 4.2 g. |
| N,N'-methylenebisacrylamide | 0.8 g. |
| Methylene blue | 10 mg. |
| Water (deionized) | 80 ml. |

Solutions 2, 3, 4 and 5 were added in sequence to Solution 1 with stirring to obtain thorough mixing. This mixture was then flow coated on a 1/16-inch degreased, grained aluminum sheet which had been previously brushed with a 5-percent gelatin solution and allowed to dry. The light-sensitive layer was allowed to dry under yellow safelight illumination and was then exposed for 2 minutes in contact with a line negative as in the preceding examples. After washing with water at a temperature of 30°–35° C. to remove unexposed areas, a black positive relief image was obtained.

What is claimed is:

1. A photopolymerizable composition comprising:
a. a polymerizable ethylenically unsaturated vinyl compound; and
b. a photosensitive polymerization initiator comprising a combination of:
1. a light-sensitive aromatic diazo-N-sulfonite, and
2. a photoreducible dye.

2. The composition of claim 1 including a polymerization accelerator selected from primary secondary, or tertiary aliphatic or aromatic amines or their salts.

3. The composition of claim 2 including a polymerization accelerator selected from aldehyde/bisulfite addition products.

4. The composition of claim 1 wherein said diazosulfonate is derived from a p-phenylene diamine and bears a substituent meta to the diazo group.

5. A photoimaging material comprising:
a. a support; and
b. a coating on said support of a photopolymerizable composition according to claim 1.

6. Photoimaging material according to claim 5 wherein said composition includes a distinctly colored pigment or dye.

7. Photoimaging material according to claim 5 wherein said composition includes a water-dispersable binder.

8. A photoimaging process comprising:
a. exposing material according to claim 5 imagewise to light for a time sufficient to effect polymerization in the light-exposed areas of said composition; and
b. effecting a separation between the exposed, polymerized and unexposed, unpolymerized areas of said coating, thereby forming an image defining said imagewise light exposure.

9. The process according to claim 8 wherein said separation is effected by washing unexposed areas from said support.

10. The process according to claim 8 wherein said separation is effected by transferring one of said areas to a receiving surface.

* * * * *

PO-1050
(5/69)

UNITED STATES PATENT OFFICE
CERTIFICATE OF CORRECTION

Patent No. 3,637,375 Dated 25 January 1972

Inventor(s) Steven Levinos

It is certified that error appears in the above-identified patent and that said Letters Patent are hereby corrected as shown below:

Front Page, immediately following item "[72] Inventor . . . ," insert --[73] Assignee: Keuffel & Esser Company, Morristown, N.J.--.

Signed and sealed this 17th day of October 1972.

(SEAL)
Attest:

EDWARD M.FLETCHER,JR.
Attesting Officer

ROBERT GOTTSCHALK
Commissioner of Patents